US00RE35005E

United States Patent [19]

Torres

[11] E Patent Number: Re. 35,005

[45] Reissued Date of Patent: Aug. 1, 1995

[54] REPLACEMENT SPONGE ASSEMBLY FOR MOPS

[75] Inventor: Bonifacio Torres, Matteson, Ill.

[73] Assignee: M. B. Walton, Inc., Chicago, Ill.

[21] Appl. No.: 843,505

[22] Filed: Feb. 28, 1992

Related U.S. Patent Documents

Reissue of:

[64] Patent No.: 4,908,901
Issued: Mar. 20, 1990
Appl. No.: 271,162
Filed: Nov. 14, 1988

[51] Int. Cl.[6] ..... A47L 13/24

[52] U.S. Cl. ..... 15/119.1; 15/147 C; 15/148; 15/244.4

[58] Field of Search ..... 15/119.1, 119.2, 147 C, 15/148, 147 R, 228, 229.6, 244.2, 244.6, 171, 176.5, 146, 147 A, 151, 152, 153, 150, 116.2, 142, 244.1

[56] References Cited

U.S. PATENT DOCUMENTS

| | | | |
|---|---|---|---|
| 1,362,811 | 12/1920 | Mills . | |
| 2,440,014 | 4/1948 | Ludwick . | |
| 2,651,069 | 9/1953 | Hoffman . | |
| 3,395,415 | 8/1968 | Leland | 15/121 |
| 3,713,184 | 1/1973 | Leland | 15/229 B |
| 3,727,259 | 4/1973 | Wilson | 15/119 |
| 3,843,993 | 10/1974 | Leland | 15/231 |
| 4,196,488 | 4/1980 | Barry | 15/119 |
| 4,333,198 | 6/1982 | Voshikian | 15/119 |
| 4,481,688 | 11/1984 | Graham | 15/119 |
| 4,706,323 | 11/1987 | Batchelor | 15/119 |

OTHER PUBLICATIONS

Label on, and instruction sheet enclosed in, package for Butler Grime Fighter Roller Mop Squeez-a-Matic Refill (also called "Universal TV mop refill") by Suburbanite, Holliston, Mass.

Label on front, and instructions printed on back, of package for Quickie Universal Roller Mop Refill #0572, by Quickie Manufacturing Corporation, Cinnaminson, N.J.

*Primary Examiner*—Frankie L. Stinson
*Attorney, Agent, or Firm*—Leydig, Voit & Mayer, Ltd.

[57] ABSTRACT

A sponge assembly for wringer-type mops which includes a sponge firmly held by a sponge carrier. The sponge carrier is provided with a plurality of means for operative attachment to a wringer-type mop. The plurality of attachment means on the sponge carrier adapts the sponge assembly for use with a variety of mop constructions and provides a sponge assembly which is particularly advantageous for use as a replacement for worn-out sponge assemblies.

15 Claims, 1 Drawing Sheet

FIG. 1
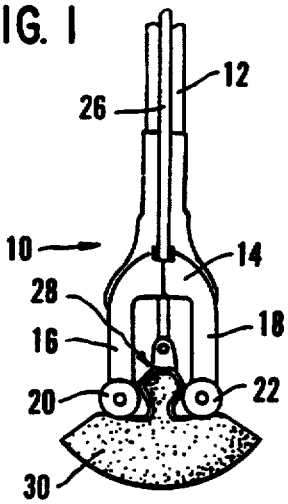
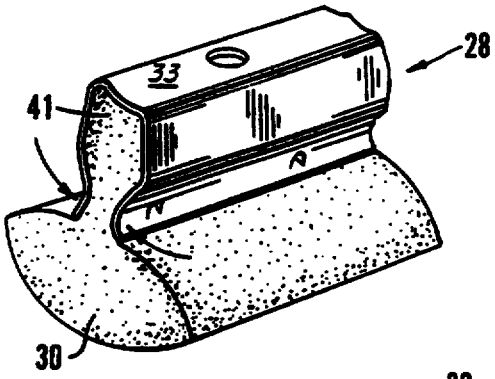
FIG. 2
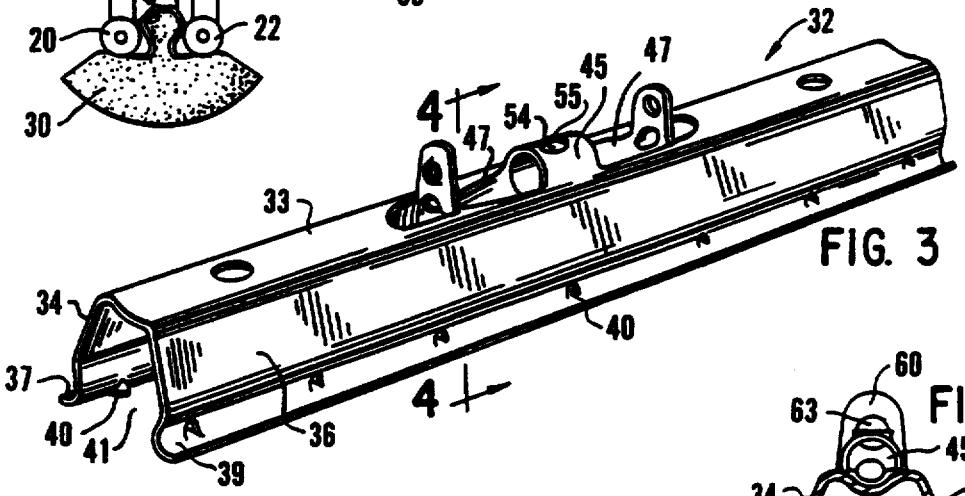
FIG. 3
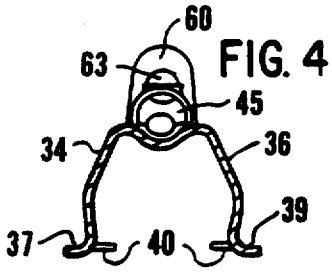
FIG. 4
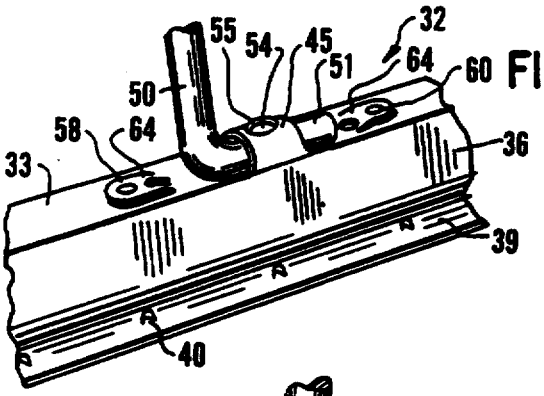
FIG. 5
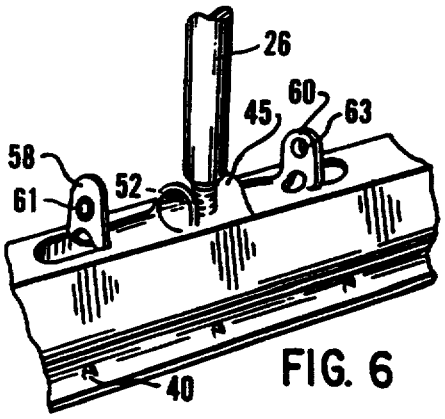
FIG. 6
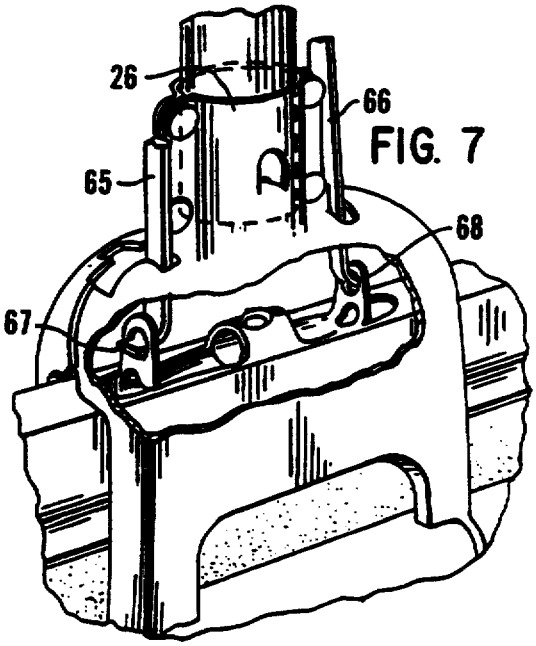
FIG. 7

REPLACEMENT SPONGE ASSEMBLY FOR MOPS

Matter enclosed in heavy brackets [ ] appears in the original patent but forms no part of this reissue specification; matter printed in italics indicates the additions made by reissue.

BACKGROUND

Wringer-type sponge mops are well known. For example, such wringer-type sponge mops are disclosed in U.S. Pat. Nos. 4,333,198, 4,481,688 and 4,706,323. These mops include a sponge retainer or carrier and operate so that the sponge is movable between a cleaning position and a wringing position. In the wringing position the sponge may be subjected to squeezing pressure by opposing rollers which wring the water from the sponge.

In order that the sponge may be replaced from time to time in wringer-type sponge mops, the sponge itself is held in a rigid, usually metal, sponge carrier which is removably attached to the operating rod of the sponge mop. The manner of attaching the sponge assembly to different sponge mops varies, primarily depending upon the particular brand or manufacturer. Because the attachment means does vary, particular replacement sponge assemblies can be used only with particular mops, thus limiting the choice of replacement sponges. This, of course, is disadvantageous and represents a real inconvenience and possibly unnecessary expense to the mop users. It also necessitates that retail suppliers carry a variety of replacement sponge assemblies even though they may limit their own sales of sponge mops to a particular brand.

Recognizing the retailer's and user's frustrations of having to match particular replacement sponge assemblies with particular mops and the excess inventories and costs associated therewith, manufacturers have designed and offered so-called universal replacement sponge assemblies. These, however, have suffered from one or more shortcomings, including the failure to be "user friendly", i.e., simple for the user to attach to the mop. Thus, for example, some replacement mop assemblies are accompanied by adapter kits which are difficult for the inexperienced to employ.

OBJECTS OF THE INVENTION

It is therefore a principal object of this invention to provide a carrier for a mop sponge having a plurality of different means for attachment to a mop.

It is another object of this invention to provide a sponge assembly which is adapted for use with a variety of wringer mops.

It is still another object of this invention to provide a sponge assembly which is adapted for ready attachment to wringer mops by various means.

It is a further object of the invention to provide a replacement sponge assembly which can be readily and simply attached by the users to sponge mops of various constructions.

SUMMARY OF THE INVENTION

The present invention provides a sponge assembly for wringer-type mops which includes a sponge firmly held by a sponge carrier. The sponge carrier is provided with a plurality of means for operative attachment in a simple manner to wringer-type sponge mops. The plurality of attachment means on the sponge carrier adapts the sponge assembly for use with a variety of mop constructions and provides a sponge assembly which is particularly advantageous for use as a replacement sponge assembly.

DESCRIPTION OF THE DRAWINGS

The present invention and the advantages thereof will be apparent from the following description and drawings wherein:

FIG. 1 is a schematic side elevational view of the lower portion of a roller sponge mop.

FIG. 2 is a fragmentary perspective view of a sponge assembly in accordance with the present invention showing a sponge inserted within a sponge carrier.

FIG. 3 is a perspective view of a sponge carrier in accordance with the present invention having multiform mop attachment means.

FIG. 4 is a view taken on the line 4—4 of FIG. 3.

FIG. 5 is a fragmentary view showing one means for attaching the sponge carrier of the invention to the operating rod of a mop.

FIG. 6 is a fragmentary view showing another means for attaching the sponge carrie of the invention to the operating rod of a mop.

FIG. 7 is a fragmentary view showing still another means for attaching the sponge carrier of the invention to the operating rod of a mop.

DESCRIPTION OF PREFERRED EMBODIMENTS

Referring to the drawings, FIG. 1 shows the lower portion of a wringer-type mop 10 having an elongate handle 12 and head 14. The head 14 is provided with spaced walls 16 and 18 each having attached at the lower ends rollers 20 and 22.

Operating rod 26 has attached thereto a cleaning sponge assembly designated by the numeral 28. By means of operating rod 26 the sponge assembly 28 can be retracted upwardly so that sponge 30 is squeezed between rollers 20 and 22 and moved downwardly to an extended position so that the sponge 30 is in cleaning position.

The sponge assembly 28 includes sponge 30 which can be of a suitable absorbent resilient material, such as a regenerated cellulose sponge, and a sponge retainer or carrier 32. The elongated channel-shaped sponge carrier 32 has a slightly concave top 33 and two spaced apart angled side walls 34 and 36 which are V-shaped and which extend downwardly. The side walls 34 and 36 have outwardly turned lower edges 37 and 39 which provide additional support surfaces for sponge 30. The sponge carrier 32 can be formed of a rigid material, preferably a metal and more preferably zinc coated metal, so as to resist rust and corrosion.

The preferred sponge carrier 32 can be formed of a metal by a stamping operation and can be of any suitable length so as to be useful with a variety of mop sizes. Typically, for use as a sponge replacement assembly, the sponge carrier 32 will have a length of about 8¼ or 9¾ or 13¾ inches to fit the most common wringer mops. The downwardly extending side walls 34 and 36 have pushed in inwardly extending gripping detents or fingers 40 which engage and secure sponge 30, the top portion of which is inserted within the elongated channel 41 defined by top 33 and sidewalls 34 and 36. After insertion of the upper portion of sponge 30 in channel 41, the lower free ends of the side walls 34 and 36 are bent inwardly, as shown in FIG. 2, forming a trapezoidal configuration in cross-section and compressing the upper portion of sponge 30 so as to firmly secure the same within channel 41 in flaring manner. The V-shape of side walls 34 and 36 facilitates inward bending of the lower ends of the side walls so as to grip and secure the sponge. Gripping fingers 40 within channel 41 further serve to lock sponge 30 in place, even when subjected to severe mopping stresses.

Centrally located on top 33 of sponge carrier 32 is an upwardly protruding symmetrical uniformly rounded latch tunnel 45. The carrier top 33 is preferably formed with depressions 47 which extend outwardly from each end of the latch tunnel 45. The depressions 47 are sloped, with the depth of the depressions being greater adjacent each end of the latch tunnel 45.

Latch tunnel 45 provides one form of attaching means by which sponge assembly 28 is operatively connected to operating rod 26 of a mop whereby it can be shifted from a cleaning position to a wringing position and vice versa. To this end, the operating rod 26 has attached thereto or integral therewith a sponge connecting element of one type or another depending upon the manufacture of the mop. Certain commercially available mops have a connecting element in the form of an L-shaped latch hook 50 as shown in FIG. 5. The distal end 51 of latch hook 50 extends perpendicular to operating rod 26 and is slidably received in latch tunnel 45. When the latch hook 50 is inserted into latch tunnel 45, the sponge assembly 28 is thus operatively attached to the operating rod 26 and can be moved thereby to an extended cleaning position or to an inwardly retracted wringing position.

A pair of bendable apertured tabs 58 and 60 are cut in top 33 of sponge carrier 32. The tabs 58 and 60 can be positioned in either an upstanding position as shown in FIGS. 3, 4, 6 and 7 of the drawings or the tabs can be bent downwardly into a substantially horizontal position as shown in FIG. 5. When the tabs are bent downwardly into a substantially horizontal position small raised humps, as indicated at 64, are formed at the bend lines. The raised humps 64 together with the sloping depressions 47 in top 33 of the sponge carrier prevent the longitudinal movement of the latch hook 50 out of latch tunnel 45. The bendable tabs 58 and 60 can be readily formed during stamping of the sponge carrier 32.

In other commercial sponge mops, the connecting element for the sponge assembly takes the form of a tapered threaded screw portion 52 as illustrated in FIG. 6. The connecting screw element 52 can again be integral with or attached to operating rod 26. To accommodate screw-type connecting elements, a circular opening 54 having an annular upturned internally threaded lip 55 is provided in the upper surface of latch tunnel 45. The connecting screw element 52 is threadably engaged within the threaded opening 54 to secure the sponge assembly to the mop through the operating rod 26. While in FIG. 6 the tapered portion 52 forming the connecting element is shown as being threaded so as to be threadably engagable with the threaded lip 55, it is not necessary that these elements be threaded. If desired, these elements can be threadless and adapted for engagement simply by means of friction.

Another form of means for attaching the sponge assembly of this invention to a wringer mop is illustrated in FIG. 7. According to this embodiment, the bendable apertured tabs 58 and 60 are employed in upstanding substantially vertical position as shown in the drawings. The tabs 58 and 60 have openings 61 and 63, respectively, therein which are each adapted to receive spaced apart L-shaped connecting elements 65 and 66 which depend from a mop operating rod 26. The spaced apart connecting elements 65 and 66, which are generally formed of metal and present in certain commercial "Roll-O-Matic ®" sponge mops, can be flexed so that by simply squeezing them together the horizontally extending base portions 67 and 68 can be easily guided into the openings 61 and 63.

The openings 61 and 63 in bendable tabs 58 and 60 can also receive a rigid hooking member such as the tip of a small screw driver or nail to assist in bending the tabs in desired direction rather than by hand alone, if desired.

From the foregoing description it is apparent that the disclosed sponge assembly is readily adaptable for use as a replacement in a variety of sponge roller mops. The sponge assembly has various means for attachment to sponge mops and thus provides a widely adaptable replacement sponge assembly for use with different mops. This affords flexibility nd convenience to users in the selection of replacement sponges. The various attaching means provided on the sponge carrier can be readily formed therein during the metal stamping operation.

Those modifications and equivalents which fall within the spirit of the invention are to be considered a part thereof.

What is claimed is:

1. A sponge carrier for use with a sponge mop comprising [an] *a one-piece* elongated channel-shaped sponge carrier adapted to receive and securely hold a mop sponge, said *one-piece* elongated sponge carrier [carrying] *including* a plurality of different type means for attaching said carrier to a sponge mop, said means including a latch tunnel for reception of a latch hook, a threaded opening for screw attachment of the sponge carrier to a mop and spaced apart tabs positionable in upstanding position having openings therein for reception of mop connection elements.

2. A sponge carrier in accordance with claim 1 wherein the sponge carrier is formed of zinc-coated metal.

3. A sponge carrier for use with a sponge mop comprising an elongated channel-shaped sponge carrier adapted to receive and securely hold a mop sponge, the elongated channel-shaped sponge carrier having on its top surface a centrally located upraised tunnel portion forming a latch hook for attachment of the sponge carrier to a mop, the upraised tunnel portion on the top surface of the sponge carrier having an opening therein for attachment of the sponge carrier to a mop, the elongated channel-shaped sponge carrier having on its top surface two spaced apart tabs bendable between a substantially vertical position and a substantially horizontal position, each of said tabs having openings therein for reception of mop connection elements.

4. A sponge carrier in accordance with claim 3 wherein the sponge carrier is formed of zinc-coated metal.

5. A sponge carrier in accordance with claim 3 wherein the upraised tunnel portion on the top surface of the sponge carrier has an internally threaded opening therein for screw attachment of the sponge carrier to a mop.

6. A sponge assembly for use with a sponge mop comprising [an] *a one-piece* elongated channel-shaped sponge carrier having secured therein a mop sponge, said *one-piece* elongated sponge carrier [carrying] *including a plurality of different type means for attaching said carrier to a sponge mop, said means including a latch tunnel for reception of a latch hook, a threaded opening for screw attachment of the sponge carrier to a mop and spaced apart tabs positionable in upstanding position having openings therein for reception of mop connection elements.*

7. A sponge assembly for use with a sponge mop comprising an elongated channel-shaped sponge carrier having secured therein a mop sponge, the elongated channel-shaped sponge carrier having on its top surface a centrally located upraised tunnel portion forming a latch hook for attachment of the sponge carrier to a mop, the upraised tunnel portion on the top surface of the sponge carrier having an opening therein for attachment of the sponge carrier to a mop, the elongated channel-shaped sponge carrier having on its top surface two spaced apart tabs bendable between a substantially vertical position and a substantially horizontal position, each of said tabs having openings therein for reception of mop connection elements.

8. A sponge carrier in accordance with claim 7 wherein the upraised tunnel portion on the top surface of the sponge carrier has an internally threaded opening therein for screw attachment of the sponge carrier to a mop.

9. A sponge carrier in accordance with claim 7 wherein the sponge carrier is formed of zinc-coated metal.

*10. The sponge carrier in accordance with claim 3 wherein said two spaced apart tabs form small raised humps at the bend lines when bent to a substantially horizontal position.*

*11. The sponge assembly in accordance with claim 7 wherein said two spaced apart tabs form small raised humps at the bend lines when bent to a substantially horizontal position.*

*12. A sponge carrier for use with a sponge mop comprising an elongated channel-shaped sponge carrier adapted to receive and securely hold a mop sponge, the elongated channel-shaped sponge carrier having as part of its top surface a centrally located upraised tunnel portion forming a latch hook for attachment of the sponge carrier to a mop, the upraised tunnel portion on the top surface of the sponge carrier having an internally-threaded opening therein for screw attachment of the sponge carrier to a mop, the elongated channel-shaped sponge carrier having as part of its top surface two spaced apart tabs bendable between a substantially vertical position and a substantially horizontal position, each of said tabs having openings therein for reception of mop connection elements when bent to substantially vertical position and forming small raised humps at the bend lines when bent to a substantially horizontal position.*

*13. A sponge carrier for use with a sponge mop comprising a one piece elongated channel-shaped sponge carrier adapted to receive and securely hold a mop sponge, said one piece elongated sponge carrier including a plurality of different type means for attaching said carrier to a sponge mop, said means including a centrally-located upraised latch tunnel for reception of a latch hook operatively connected to a mop and two spaced apart tabs on the top surface of said elongated channel-shaped sponge carrier outboard of said centrally-located upraised latch tunnel, said spaced-apart tabs being bendable between a substantially vertical position and a substantially horizontal position, each of said tabs having openings therein for reception of mop connection elements when bent to substantially vertical position and forming small raised humps at the bend lines when bent to a substantially horizontal position.*

*14. A sponge carrier for use with a sponge mop comprising a one piece elongated channel-shaped sponge carrier adapted to receive and securely hold a mop sponge, said one piece elongated sponge carrier including a plurality of different type means for attaching said carrier to a sponge mop, said means including a centrally-located upraised latch tunnel for reception of a latch hook operatively connected to a mop, and a circular opening through the upper surface of the upraised latch tunnel, said circular opening having an annular upturned internally-threaded lip for operative attachment of the sponge carrier to a connecting screw element of a mop.*

*15. A sponge carrier for use with a sponge mop comprising a one piece elongated channel-shaped sponge carrier adapted to receive and securely hold a mop sponge, said one piece elongated sponge carrier having a plurality of different type means for attaching said carrier to a sponge mop, said means including a centrally-located circular opening through the upper surface of the elongated channel-shaped sponge carrier, said circular opening having an annular internally-threaded lip for operative attachment of the sponge carrier to a connecting screw element of a mop, and two spaced-apart tabs on said upper surface of said elongated channel-shaped sponge carrier on each side of said circular opening said spaced apart tabs being bendable between a substantially vertical position and a substantially horizontal position each of said tabs having openings therein for reception of mop connection elements when bent to substantially vertical position.*

* * * * *